US012276792B2

(12) United States Patent
Haque et al.

(10) Patent No.: US 12,276,792 B2
(45) Date of Patent: Apr. 15, 2025

(54) WAVEGUIDE WITH ANTI-REFLECTION PROPERTIES

(71) Applicant: GOOGLE LLC, Mountain View, CA (US)

(72) Inventors: Syed Moez Haque, Vaughan (CA); Shreyas Potnis, Kitchener (CA); Ali Karbasi, San Jose, CA (US); Timothy Paul Bodiya, Toronto (CA); Daniel Adema, Kitchener (CA); Ian Andrews, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 264 days.

(21) Appl. No.: 17/854,825

(22) Filed: Jun. 30, 2022

(65) Prior Publication Data

US 2023/0003953 A1    Jan. 5, 2023

Related U.S. Application Data

(60) Provisional application No. 63/217,594, filed on Jul. 1, 2021, provisional application No. 63/238,960, filed on Aug. 31, 2021.

(51) Int. Cl.
  *G02B 27/01* (2006.01)
  *G02B 1/115* (2015.01)
  *G02B 6/42* (2006.01)

(52) U.S. Cl.
  CPC .......... *G02B 27/0172* (2013.01); *G02B 1/115* (2013.01); *G02B 6/4206* (2013.01); *G02B 6/4209* (2013.01); *G02B 2027/0125* (2013.01)

(58) Field of Classification Search
  CPC .... G02B 6/4206; G02B 6/4209; G02B 1/115; G02B 2027/0125; G02B 2027/0172
  See application file for complete search history.

(56) References Cited

U.S. PATENT DOCUMENTS 10,845,596 B2 *  11/2020  Lee .................... G02B 27/0172
11,280,937 B2 *   3/2022  Peroz ................... G02B 6/0026
2018/0252857 A1   9/2018  Glik et al.
(Continued)

FOREIGN PATENT DOCUMENTS

KR    20210026075 A  *  3/2021  ............... F21V 8/00
WO       2018140651 A1    8/2018

OTHER PUBLICATIONS

Yeom et al., English Translation of KR-20210026075-A, six pages (2021). (Year: 2021).*

(Continued)

*Primary Examiner* — Daniel Petkovsek

(57) ABSTRACT

A head-mounted display (HMD) system includes a lens element supported by a support structure. The lens element includes a waveguide that includes an incoupler, an outcoupler, and an exit pupil expander. The incoupler is disposed within a first area of the waveguide. The outcoupler is disposed within a second area of the waveguide. The exit pupil expander is disposed within a third area of the waveguide. An anti-reflection coating is formed via fabrication used to form the incoupler, the outcoupler, and the exit pupil expander. The anti-reflection coating is disposed within a fourth area of the waveguide different than the first, second, and third areas of the waveguide.

18 Claims, 18 Drawing Sheets

(56) References Cited

U.S. PATENT DOCUMENTS

| | | | |
|---|---|---|---|
| 2019/0056591 A1* | 2/2019 | Tervo | G02B 6/0038 |
| 2019/0227321 A1 | 7/2019 | Lee et al. | |
| 2020/0409148 A1* | 12/2020 | Alasaarela | G02B 6/0035 |
| 2022/0299711 A1* | 9/2022 | Bodiya | G02B 6/34 |

OTHER PUBLICATIONS

International Preliminary Report on Patentability mailed Jan. 11, 2024 for PCT Application No. PCT/ US2022/035852, 11 pages.

Gilbert, Noah, "Sub-Wavelength Diffraction Gratings as Anti-Reflective Coatings," University of Arizona, downloaded from «http://www.u.arizona.edu/~ngilbert/opti310/paper_final.pdf» on May 12, 2022; 5 pages.

International Search Report and Written Opinion mailed Nov. 7, 2022 for PCT Application No. PCT/US2022/035852, 20 pages.

Hoshino, Testuya et al., "Antireflective Grating in the Resonance Domain for Displays," Applied Optics, Optical Society of America, vol. 46, No. 5; Feb. 10, 2007; pp. 648-656.

Kikuta, Hisao et al., "Optical Elements with Subwavelength Structured Surfaces," Optical Review, vol. 10, No. 2; Mar. 1, 2003; pp. 63-73.

Song, Jung-Hwan et al., "Nonlocal Metasurfaces for Spectrally Decoupled Wavefront Manipulation and Eye Tracking," ARXIV. org; Cornell University Librabry, Ithaca, NY; Feb. 11, 2021; XP081881033; pp. 2-7.

Xiao, Jiasheng et al., "Design of Achromatic Surface Microstructure for Near-Eye Display with Diffractive Waveguide," Optics Communications, vol. 452; Apr. 5, 2019; pp. 411-416.

* cited by examiner

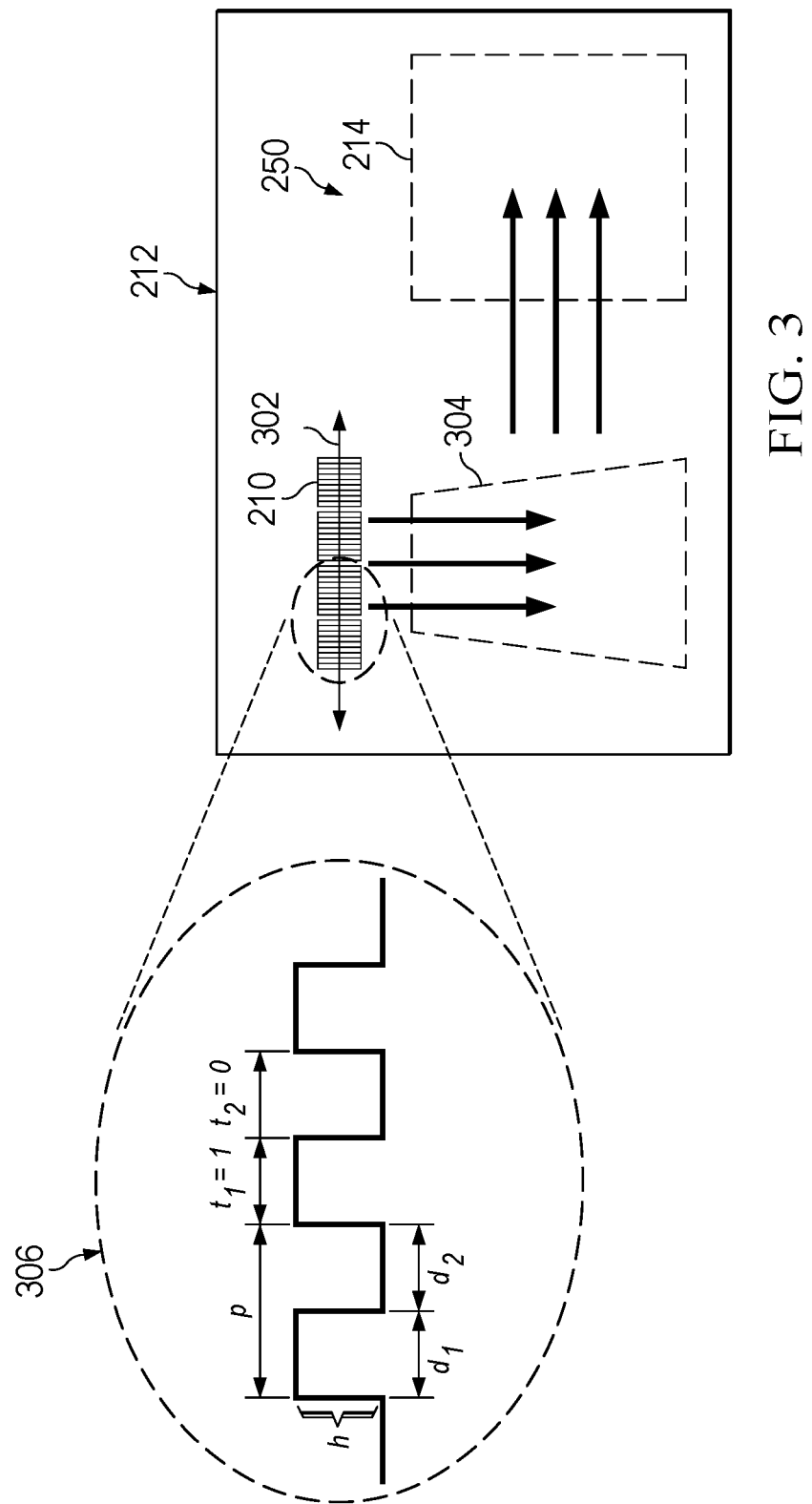

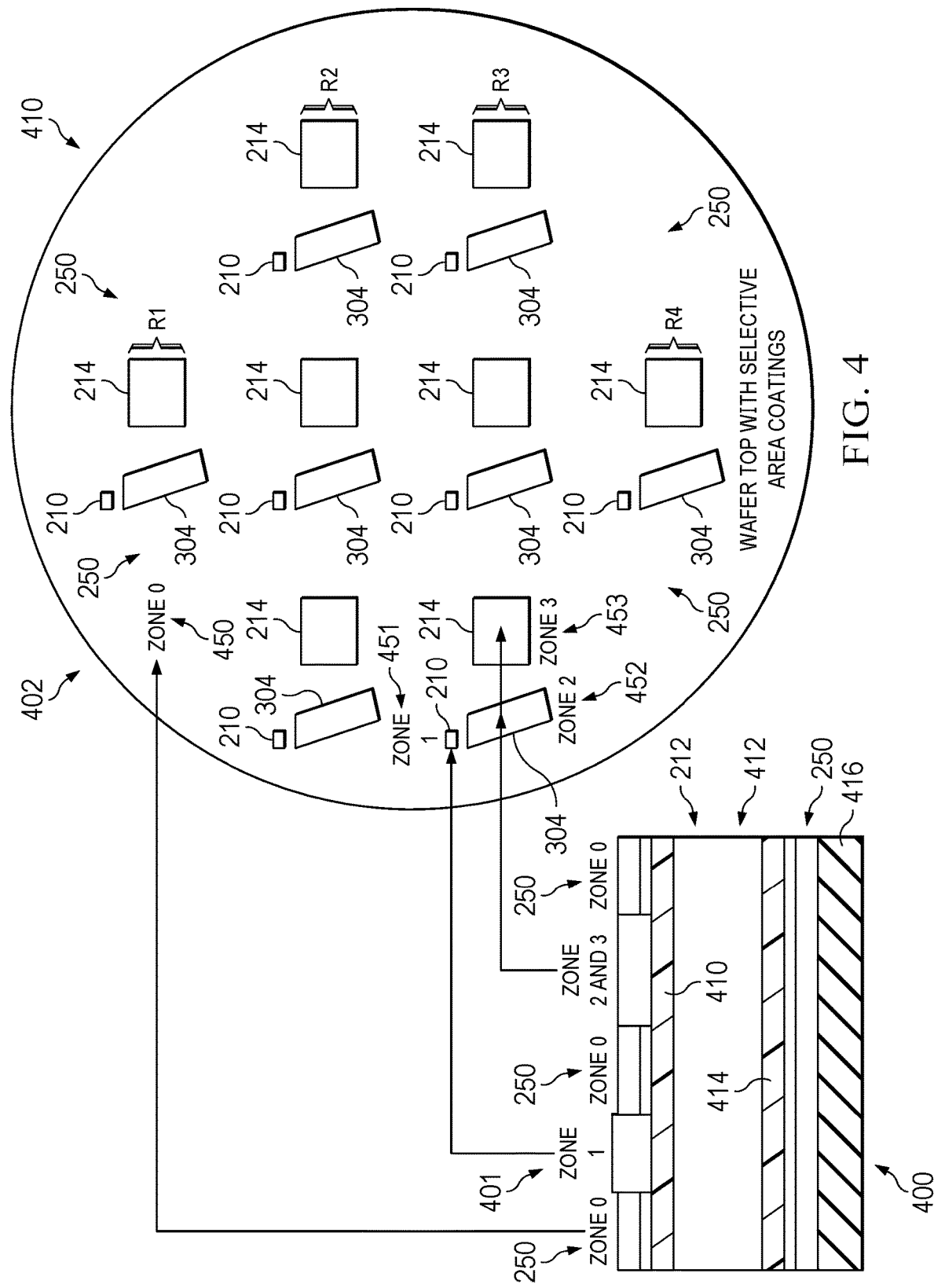

WAVEGUIDE WITH ANTI-REFLECTION PROPERTIES

CROSS-REFERENCE TO RELATED APPLICATIONS

The present application claims priority to U.S. Provisional Patent Application Ser. No. 63/217,594, entitled "WAVEGUIDES WITH IMPROVED ANTI REFLECTIVE AND/OR COLOR RESPONSE PROPERTIES" and filed on Jul. 1, 2021, and U.S. Provisional Patent Application Ser. No. 63/238,960, entitled "WAVEGUIDE COATING TARGETS AND FAB SEQUENCE BY SELECTIVE COATINGS" and filed on Aug. 31, 2021, the entireties of which are incorporated by reference herein.

BACKGROUND

In a conventional wearable head-mounted display (HMD) for augmented reality (AR), light from an image source is coupled into a light guide substrate, generally referred to as a waveguide, by an input optical coupling such as an in-coupling grating (i.e., an "incoupler"), which can be formed on a surface, or multiple surfaces, of the substrate or disposed within the substrate. Once the light beams have been coupled into the waveguide, the light beams are "guided" through the substrate, typically by multiple instances of total internal reflection (TIR), to then be directed out of the waveguide by an output optical coupling (i.e., an "outcoupler"), which can also take the form of an optical grating. The light beams projected from the waveguide overlap at an eye relief distance from the waveguide forming an exit pupil within which a virtual image generated by the image source can be viewed by the user of the HMD.

In some HMDs, the incoupler is an optical grating, which can be produced by physically forming grooves or other surface features on a surface of a waveguide, or volume features within the waveguide substrate. The overall efficiency of a grating depends on various application-specific parameters such as wavelength, polarization, and angle of incidence of the incoming light. The efficiency of a grating is also influenced by the grating design parameters, such as the distance between adjacent grating features, grating width, thickness of the grating region, and the angle the gratings form with the substrate. Also in some HMDs, an optical coating, such as an anti-reflective coating, is applied to prevent reflection from a lens of the HMD. However, due to issues with grating and coating codesigns, either the see-through performance of the display or the coating performance is often sacrificed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 shows an example of light propagation within a waveguide of a laser projection system, such as the laser projection system of FIG. 2, including an anti-reflection coating, in accordance with at least one configuration disclosed herein.

FIG. 4 illustrates both a cross-sectional view and a wafer top view of an integrated anti-reflection coating, incoupler, outcoupler device co-produced by a fabrication process, in accordance with some embodiments.

FIG. 5-1 shows an example substrate onto which the layers of other materials are deposited to form the anti-reflection coating shown in FIG. 4, in accordance with some embodiments.

FIG. 5-2 illustrates an example structure after the substrate illustrated in FIG. 5-1 is processed, in accordance with some embodiments.

FIG. 5-3 shows another example structure after the structure illustrated in FIG. 5-2 is processed, in accordance with some embodiments.

FIG. 5-4 illustrates yet another example structure after the structure illustrated in FIG. 5-3 is processed, in accordance with some embodiments.

FIG. 5-5 shows even yet another example structure after the substrate illustrated in FIG. 5-4 is processed, in accordance with some embodiments.

FIG. 5-6 illustrates one more example structure after the structure illustrated in FIG. 5-5 is processed, in accordance with some embodiments.

FIG. 5-7 shows even one more example structure after the structure illustrated in FIG. 5-6 is processed, in accordance with some embodiments.

FIG. 5-8 illustrates an additional example structure after the substrate illustrated in FIG. 5-7 is processed, in accordance with some embodiments.

FIG. 5-9 shows yet another additional example structure after the structure illustrated in FIG. 5-8 is processed, in accordance with some embodiments.

FIG. 5-10 illustrates another example structure after the structure illustrated in FIG. 5-9 is processed, in accordance with some embodiments.

FIG. 5-11 shows even another example structure after the substrate illustrated in FIG. 5-10 is processed, in accordance with some embodiments.

FIG. 5-12 illustrates one more example structure after the structure illustrated in FIG. 5-11 is processed, in accordance with some embodiments.

FIG. 5-13 shows even one more example structure after the structure illustrated in FIG. 5-12 is processed, in accordance with some embodiments.

FIG. 5-14 illustrates another example structure after the structure illustrated in FIG. 5-13 is processed, in accordance with some embodiments.

FIG. 5-15 shows even another example structure after the substrate illustrated in FIG. 5-13 is processed, in accordance with some embodiments.

FIG. 5-16 illustrates one more example structure after the structure illustrated in FIG. 5-15 is processed, in accordance with some embodiments.

FIG. 5-17 shows even one more example structure after the structure illustrated in FIG. 5-16 is processed, in accordance with some embodiments.

FIG. 5-18 illustrates one more example structure after the structure illustrated in FIG. 5-17 is processed, in accordance with some embodiments.

FIG. 5-19 shows yet one more example structure after the structure illustrated in FIG. 5-18 is processed, in accordance with some embodiments.

FIG. 6 illustrates a block diagram of an example method to dispose the anti-reflection coating shown in FIGS. 2-5 on an area of the waveguide, in accordance with some embodiments.

DETAILED DESCRIPTION

High-quality anti-reflection coatings help to minimize the visibility of flashes of reflection from a waveguide. Typically, anti-reflection coatings are applied by depositing layers of thin-films on a waveguide substrate of the waveguide. The number of layers, layer material, and layer thickness determines the reflection properties. These layers are also typically deposited across an entirety of the waveguide, across an incoupler, an outcoupler, and an exit pupil expander and areas in-between these components. A problem with such anti-reflection coating across the entirety of the waveguide, including the incoupler, the outcoupler, and the exit pupil expander, is that anti-reflective performance of waveguides is compromised to allow for better display metrics, such as efficiency and uniformity.

FIGS. 1-5 illustrate techniques for decoupling the gratings of the incoupler, the outcoupler, and the exit pupil expander from an anti-reflection coating. In some embodiments, the anti-reflection coating is disposed in areas between the areas in which the incoupler, the outcoupler, and the exit pupil expander are disposed. Thus, instead of having to arrive at a compromise for the anti-reflection coating, the anti-reflection coating can be optimized as not having to take into consideration anti-reflection properties of the gratings of the incoupler, the outcoupler, and the exit pupil expander. Grating optimization can be performed for display and coating optimization for performance of the anti-reflection coating. This solution also improves upon typical anti-reflection coatings for waveguide gratings as it also takes advantage of the anti-reflection properties that gratings possess, such as their ability to act as a quarterwave stack depending on the fill factors selected.

Figure 1:
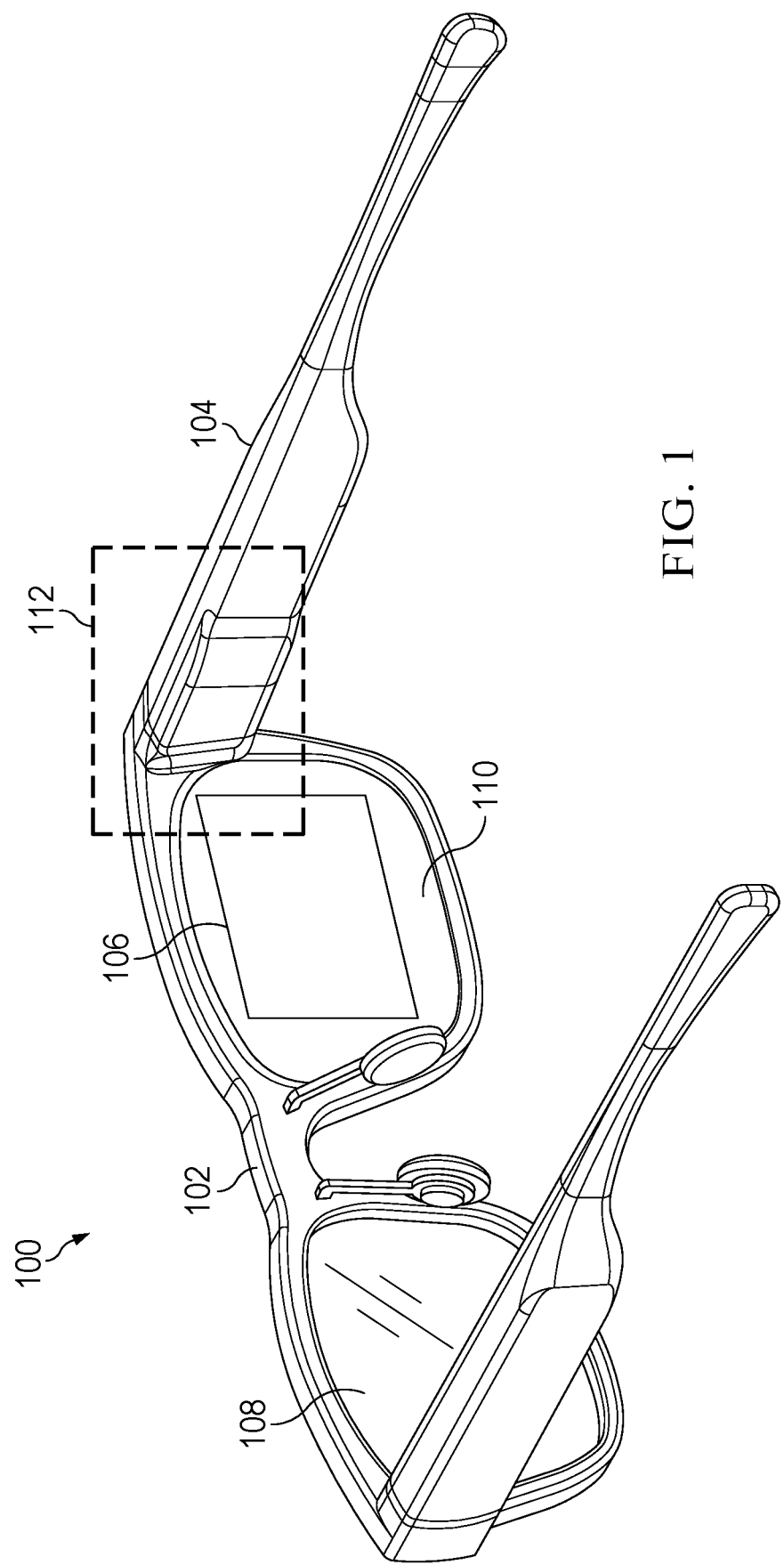
FIG. 1 shows an example display system having a waveguide with selective placement of anti-reflection coatings, in accordance with at least one configuration disclosed herein.

FIG. 1 illustrates an example display system 100 having a waveguide with selective placement of anti-reflection coatings. The display system 100 includes a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted configuration, the display system 100 is a wearable head-mounted display (HMD) that includes a support structure 102 configured to be worn on the head of a user and has a general shape and appearance of an eyeglasses frame. The support structure 102 contains or otherwise includes various components to facilitate the projection of such images toward the eye of the user, such as a laser projector, an optical scanner, and a waveguide.

In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) or mixed reality (MR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler, or multiple incouplers, of the waveguide to an outcoupler of the waveguide, which outputs the display light toward an eye of a user of the display system 100. The display light is modulated and projected onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

An anti-reflection coating is applied to the waveguide of the display system 100. Specifically, this anti-reflection coating is disposed in areas outside of areas in which the incoupler, the outcoupler, and the exit pupil expander are disposed. This disposition of the anti-reflection coating allows for separate optimization of gratings of the incoupler, the outcoupler, and the exit pupil expander, from optimization of the anti-reflection coating.

In some embodiments, the projector is a matrix-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106, and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
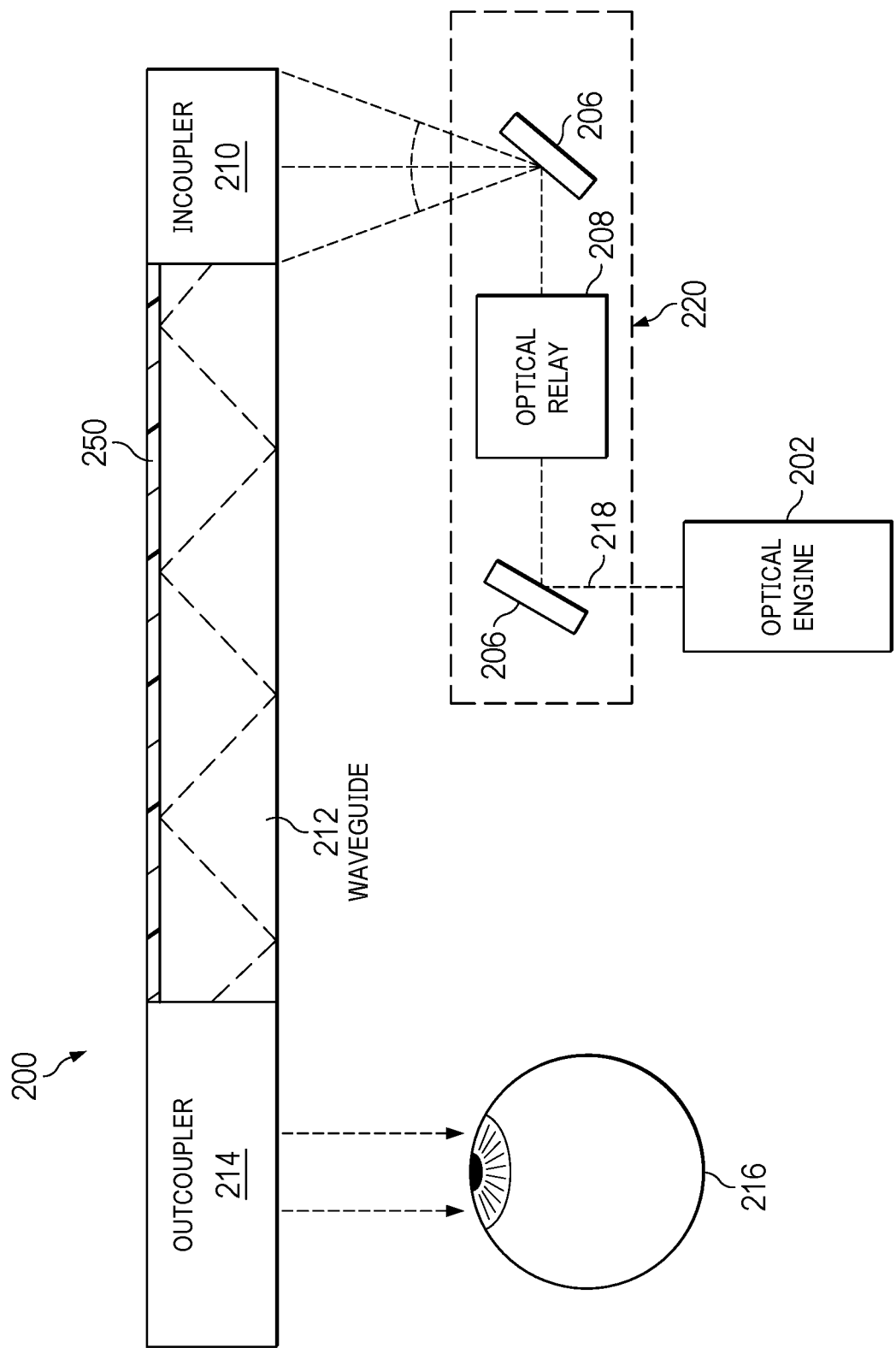
FIG. 2 illustrates a block diagram of a laser projection system that projects laser light representing images onto the eye of a user via a display system, such as the display system of FIG. 1, in accordance with at least one configuration disclosed herein.

FIG. 2 illustrates a block diagram of a laser projection system 200 that projects laser light representing images onto the eye 216 of a user via a waveguide, such as that illustrated in FIG. 1. The laser projection system 200 includes an optical engine 202, an optical scanner 220, and a waveguide 212. In some embodiments, the laser projection system 200 is implemented in a wearable heads-up display or other display systems.

The optical engine 202 includes one or more laser light sources configured to generate and output laser light (e.g., visible laser light such as red, blue, and green laser light and/or non-visible laser light such as infrared laser light). In some embodiments, the optical engine 202 is coupled to a controller or driver (not shown), which controls the timing of emission of laser light from the laser light sources of the optical engine 202 (e.g., in accordance with instructions received by the controller or driver from a computer processor coupled thereto) to modulate the laser light 218 to be perceived as images when output to the retina of the eye 216 of the user.

The optical scanner 220 includes a first scan mirror 204, a second scan mirror 206, and an optical relay 208. One or both of the scan mirrors 204 and 206 may be MEMS mirrors, in some embodiments. For example, the scan mirror 204 and the scan mirror 206 are MEMS mirrors that are driven by respective actuation voltages to oscillate during active operation of the laser projection system 200, causing the scan mirrors 204 and 206 to scan the laser light 218. Oscillation of the scan mirror 204 causes laser light 218 output by the optical engine 202 to be scanned through the optical relay 208 and across a surface of the second scan mirror 206. The second scan mirror 206 scans the laser light 218 received from the scan mirror 204 toward an incoupler 210 of the waveguide 212. In some embodiments, the scan mirror 204 oscillates along a first scanning axis, such that the laser light 218 is scanned in only one dimension (i.e., in a line) across the surface of the second scan mirror 206. In some embodiments, the scan mirror 206 oscillates along a second scan axis that is perpendicular to the first scan axis.

The waveguide 212 of the laser projection system 200 includes the incoupler 210 and the outcoupler 214. The term "waveguide," as used herein, will be understood to mean a combiner using total internal reflection (TIR), or via a combination of TIR, specialized filters, and/or reflective surfaces, to transfer light from an incoupler to an outcoupler. For display applications, the light may be a collimated image, and the waveguide transfers and replicates the collimated image to the eye. In general, the terms "incoupler" and "outcoupler" will be understood to refer to any type of optical grating structure, including, but not limited to, diffraction gratings, slanted gratings, blazed gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive diffraction grating that causes the incoupler or outcoupler to transmit light and to apply designed optical function(s) to the light during the transmission. In some embodiments, a given incoupler or outcoupler is a reflective diffraction grating that causes the incoupler or outcoupler to reflect light and to apply designed optical function(s) to the light during the reflection. In the present example, the laser light 218 received at the incoupler 210 is relayed to the outcoupler 214 via the waveguide 212 using TIR. The laser light 218 is then output to the eye 216 of a user via the outcoupler 214.

The anti-reflection coating 250 is disposed in areas of the waveguide 212 that do not have gratings disposed therein, such areas of the incoupler 210, the outcoupler 214, and the exit pupil expander 304. Thus, the anti-reflection coating 250 does not interfere with the functioning of these gratings and allows the anti-reflection characteristics of the gratings to be utilized.

In some embodiments, incoupler 210 is a substantially rectangular feature configured to receive the laser light 218 and direct the laser light 218 into the waveguide 212. The incoupler 210 may be defined by a small dimension (i.e., width) and a long dimension (i.e., length). In a configuration, the optical relay 208 is a line-scan optical relay that receives the laser light 218 scanned in a first dimension by the first scan mirror (e.g., the first dimension corresponding to the small dimension of the incoupler 210), routes the laser light 218 to the second scan mirror 206, and introduces a convergence to the laser light 218 in the first dimension. The second scan mirror 206 receives the converging laser light 218 and scans the laser light 218 in a second dimension, the second dimension corresponding to the long dimension of the incoupler 210 of the waveguide 212. The second scan mirror may cause the laser light 218 to converge to a focal line along the second dimension. In some embodiments, the incoupler 210 is positioned at or near the focal line downstream from the second scan mirror 206 such that the second scan mirror 206 scans the laser light 218 as a line over the incoupler 210.

Figures 1, 5:
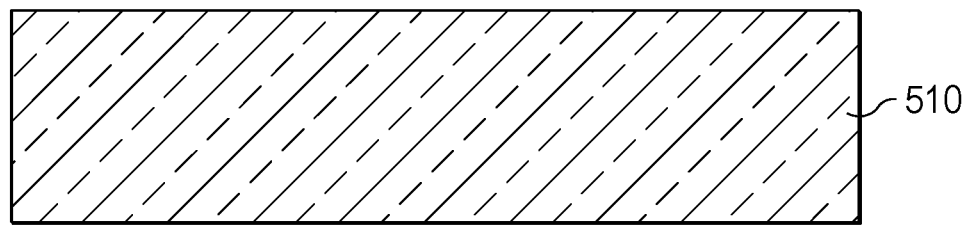
Figures 2, 5:
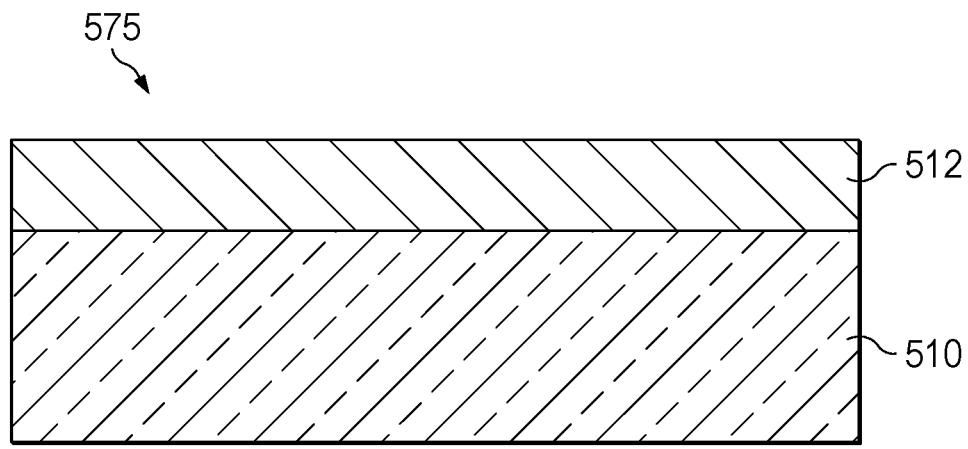
Figures 3, 5:
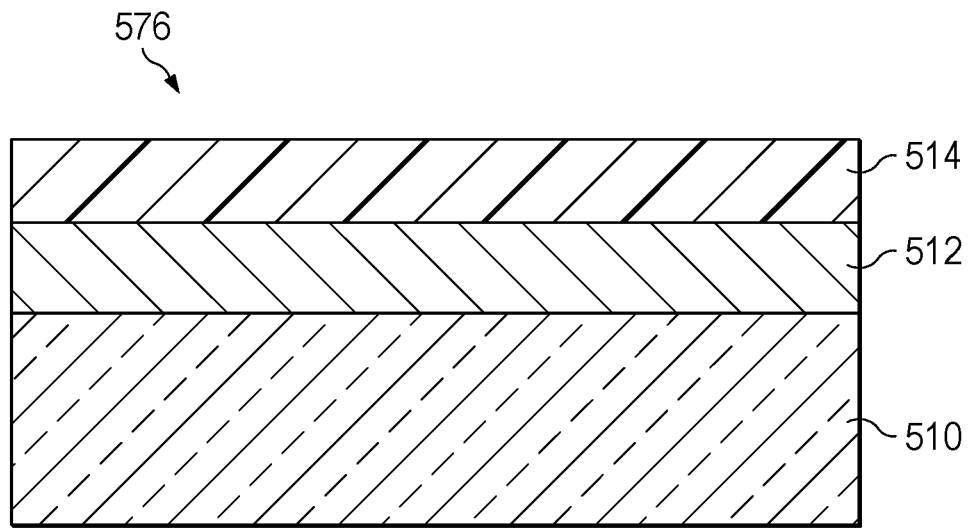

FIG. 3 shows an example of light propagation within the waveguide 212 of the laser projection system 200 of FIG. 2. As shown, light is received via incoupler 210, scanned along the axis 302, directed into an exit pupil expander 304, and then routed to the outcoupler 214 to be output from the waveguide 212 (e.g., toward the eye of the user). In some embodiments, the exit pupil expander 304 expands one or more dimensions of the eyebox of an HMD that includes the laser projection system 200 (e.g., with respect to what the dimensions of the eyebox of the HMD would be without the exit pupil expander 304). In some embodiments, the incoupler 210, the outcoupler 214, and the exit pupil expander 304 each include respective one-dimensional diffraction gratings (i.e., diffraction gratings that extend along one dimension). In some embodiment, the incoupler 210, the outcoupler 214, and the exit pupil expander 304 each include respective two-dimensional diffraction gratings (i.e., diffraction gratings that extend along two dimensions). It should be understood that FIG. 3 shows a substantially ideal case in which incoupler 210 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 210 directs light is slightly or substantially diagonal, rather than exactly perpendicular, with respect to the scanning axis 302.

Also shown in FIG. 3 is a cross-section 306 of incoupler 210 illustrating features of the grating that can be configured to tune the efficiency of incoupler 210. The period p of the grating is shown having two regions, with transmittances t1=1 and t2=0 and widths d1 and d2, respectively. The grating period is constant p=d1+d2, but the relative widths d1, d2 of the two regions may vary. A fill factor parameter x can be defined such that d1=xp and d2=(1−x)p. In addition, while the profile shape of the grating features in cross-section 306 is generally shown as being square or rectangular with a height h, the shape can be modified based on the wavelength of light that incoupler 210 is intended to receive. For example, in some embodiments, the shape of the grating features is triangular, rather than square, to create a more "saw-toothed" profile. In some embodiments, incoupler 210 is configured as a grating with a constant period but different fill factors, heights, and slant angles based on the desired efficiency of the respective incoupler 210 or the desired efficiency of a region of the respective incoupler 210.

As will be discussed in more detail below in relation to FIGS. 4 and 5-1-5-17, the incoupler 210 is disposed within a first area of the waveguide 212, the outcoupler 214 is disposed within a second area of the waveguide 212, and the exit pupil expander 304 is disposed within a third area of the waveguide 212. An anti-reflection coating 250 is formed via fabrication that is also used to form the incoupler 210, the outcoupler 214, and the exit pupil expander 304. To facilitate optimization of both anti-reflection properties of the anti-reflection coating 250 and see-through performance of the display, the anti-reflection coating 250 is disposed within a fourth area of the waveguide 212 different than the first, second, and third areas of the waveguide 212.

Figures 4, 5:
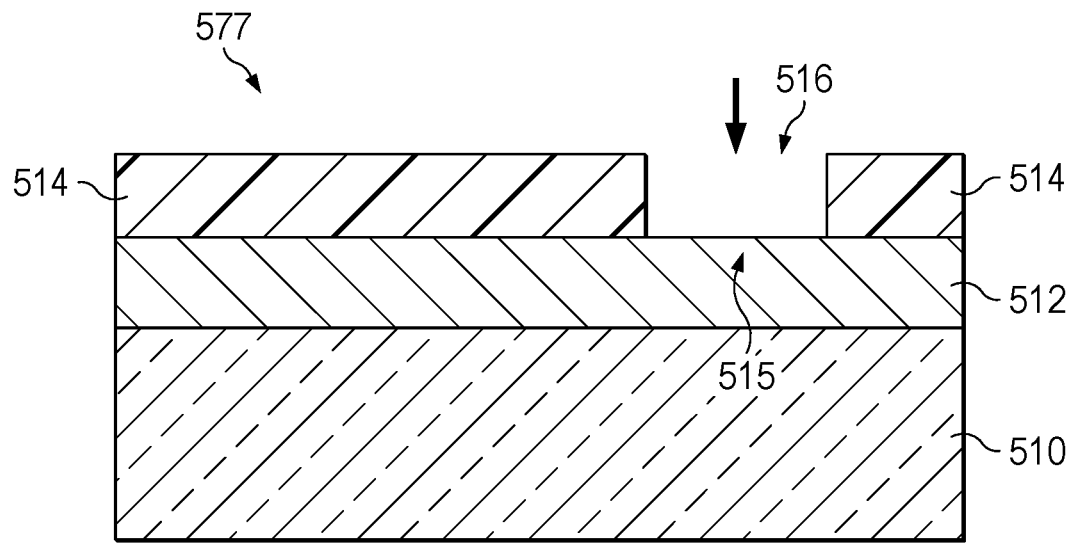
Figure 5:
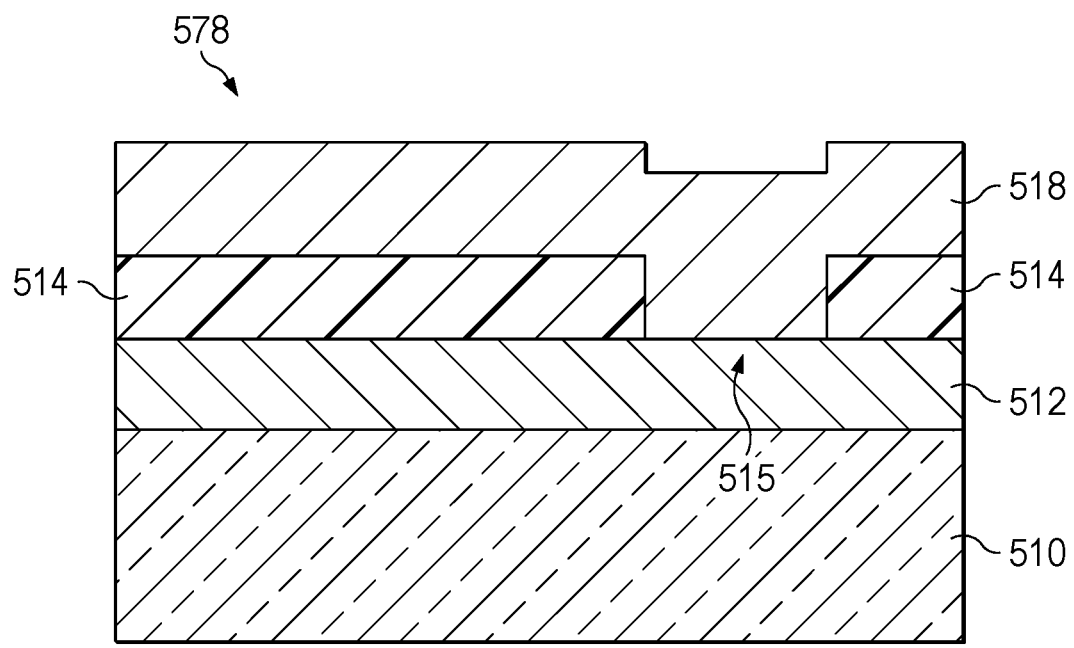

FIG. 4 illustrates both a cross-sectional view 401 and a wafer top view 402 of an integrated anti-reflection coating, incoupler, outcoupler device 400 co-produced by a fabrication process, in accordance with some embodiments. The anti-reflection coating 250, the incoupler 210, and the outcoupler 214 are integrated via at least one same fabrication layer being utilized for each of these components, as discussed below. An example of this fabrication process is shown in FIG. 5. The integrated anti-reflection coating, incoupler, outcoupler device 400 is disposed onto a substrate, such as a wafer 412. A wafer top 410 of the wafer 412 is shown with areas coated with the anti-reflection coating 250. The wafer 412 further includes a wafer bottom 414. The waveguide 212 is disposed within the wafer 412.

The wafer top 410 includes four (4) different zones, with "Zone 1" 451, a first area, corresponding to an area of the water top 410 in which a plurality of the incoupler 210, shown as incouplers 210, is disposed. "Zones 2, 3", second and third areas, correspond to an area of the wafer top 410 in which a plurality of the exit pupil expander 304 are disposed, shown as exit pupil expanders 304, and an area of the wafer top 410 in which a plurality of the outcoupler 214 are disposed, shown as outcouplers 214, respectively. As shown, the anti-reflection coating 250 includes a four-layer stack, the details of which are discussed in more detail below with respect to FIG. 5.

To maximize a circular area of the wafer top 410, the integration of the incoupler 210, the exit pupil expander 304, and the outcoupler 214 are disposed on a top row R1 of the wafer top 410 and the integration of incoupler 210, the exit pupil expander 304, and the outcoupler 214 are disposed on a bottom row R4 of the wafer top 410. Disposed between the top row R1 and the bottom row R4 are two rows of four (4) integrations of incouplers 210, the exit pupil expanders 304, and the outcouplers 214, respectively. "Zone 0" 450, a fourth area, is all areas of the wafer top 410 outside of Zones 1, 2, 3, that is all areas of the water top 410 disposed between the incouplers 210, the exit pupil expanders 304, and the outcouplers 214. As will be discussed in more detail below with the fabrication shown in FIG. 5 and the method 600 shown in FIG. 6, the anti-reflection coating 250 is selectively applied to Zone 0 450 and not to Zones 1, 2, 3. In some embodiments, the anti-reflection coating 250 can also be formed on the wafer bottom 414, with a protective coating 416, e.g., SiOx, applied to the anti-reflection coating 250 disposed onto the water bottom 414.

FIGS. 5-1-5-17 shows an example fabrication to form various structures discussed in connection with the formation of the integrated anti-reflection coating, incoupler, outcoupler device 400 shown in FIG. 4, in accordance with some embodiments. FIG. 5-1 shows an example substrate onto which the layers of other materials are deposited to form the anti-reflection coating 250, in this example a glass layer 510. FIG. 5-2 illustrates a cross-sectional view of the integrated anti-reflection coating, incoupler, outcoupler device 400 in early stages of fabrication. Deposited, such as via Physical Vapor Deposition (PVD), onto the glass layer 510 is a high index material, such as a TiOx layer 512, on an entirety of the glass layer 510 to form formation 575. In some embodiments, the TiOx layer 512 is approximately 30 nm thick, with variations in thickness possible due to manufacturing inconsistency. FIG. 5-3 illustrates another layer deposited on an entirety of the TiOx layer 512 shown in FIG. 5-2, a negative photoresist layer 514 to form formation 576. To the right of the center of the negative photoresist layer 514 shown in FIG. 5-3, an opening 516 is shown in FIG. 5-4 within the negative photoresist layer 514. The opening 516 can then be formed via an Integrated Circuit (IC) mask and exposure of an area 515 to ultraviolet (UV) light where the opening 516 is to be formed. The area 515 is then etched (wet or dry etching) to form the opening 516, thereby forming formation 577.

FIG. 5-5 illustrates another layer deposited onto the negative photoresist 514 and the opening 516 shown in FIG. 5-4, a TiOx layer 518 deposited on an entirety of the formation shown in FIG. 5-4 to form formation 578. In some embodiments, the TiOx layer 518 is also deposited via PVD. As can be seen, the TiOx layer 518 deposited above the area 515 of the opening 516 is slightly lower in height than areas adjacent to the area 515 of the opening 516 as the deposition of the TiOx layer 518 is approximately evenly applied across the TiOx layer 518 and the opening 516. A positive photoresist layer 520 is then deposited atop an entirety of the TiOx layer 518, shown in FIG. 5-6, to form formation 579. The positive photoresist layer 520 is subject to an IC mask and exposure to UV light above within the area 515, illustrated in FIG. 5-7, to form formation 580.

Figures 5, 6:
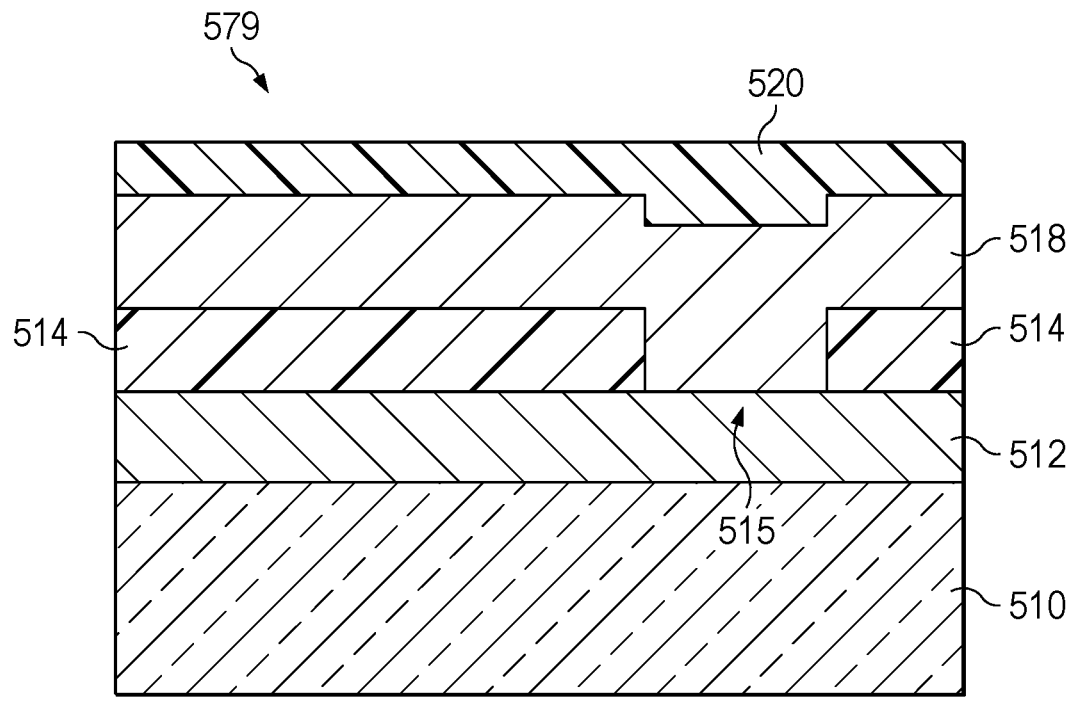
Figures 5, 6, 7:
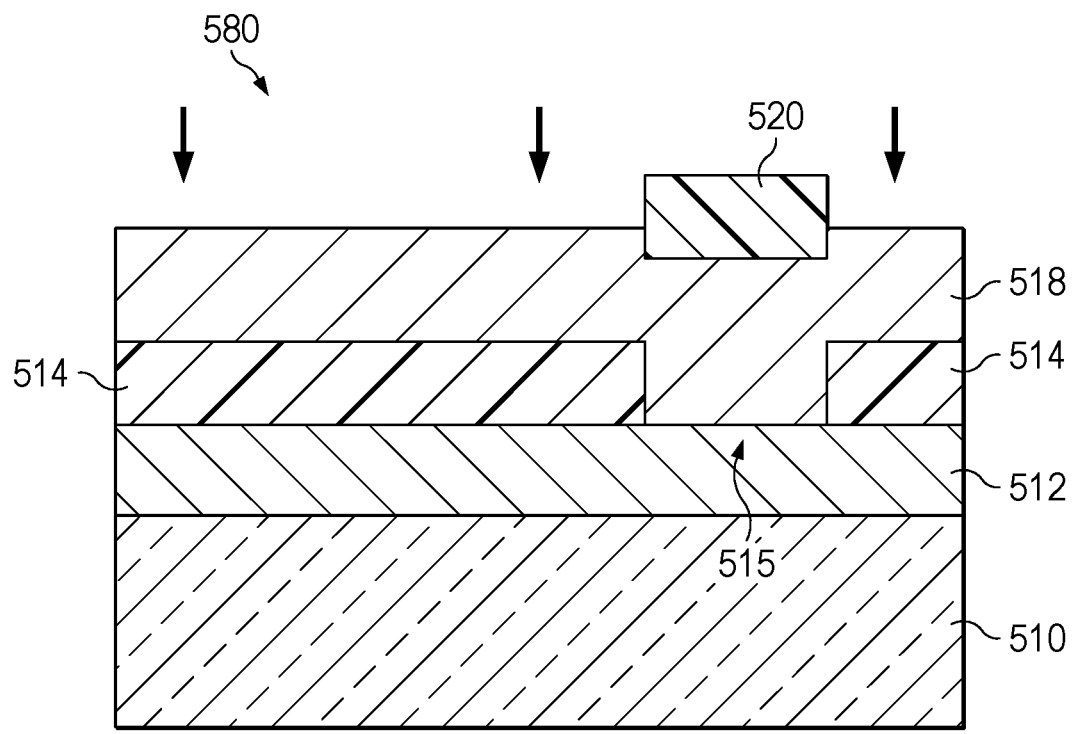
Figures 5, 6, 7, 8:
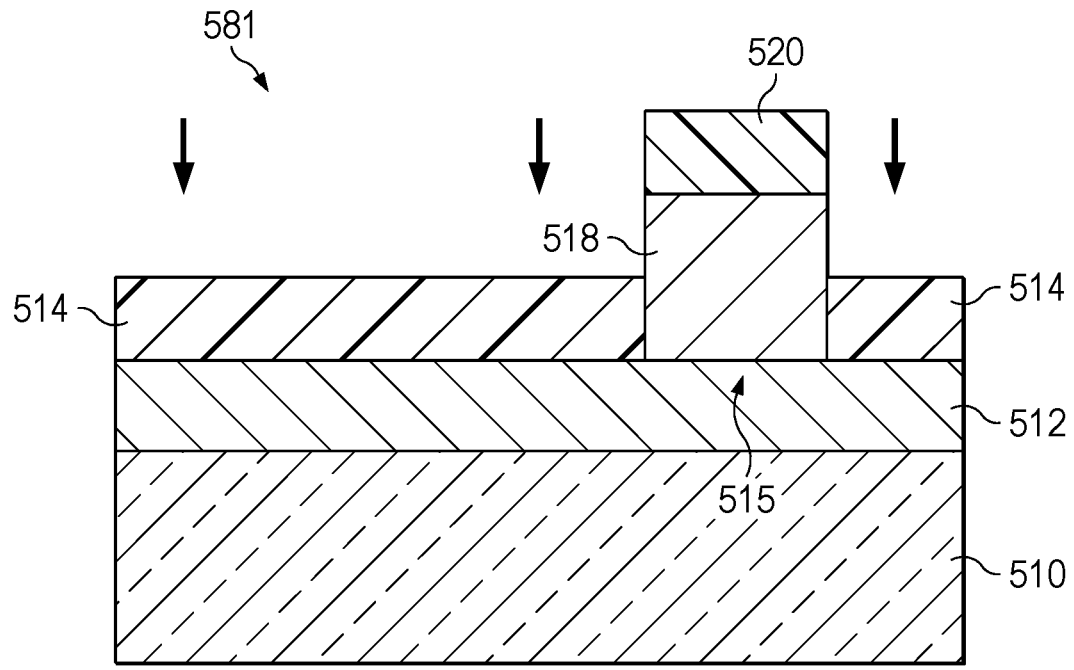
Figures 5, 6, 7, 8, 9:
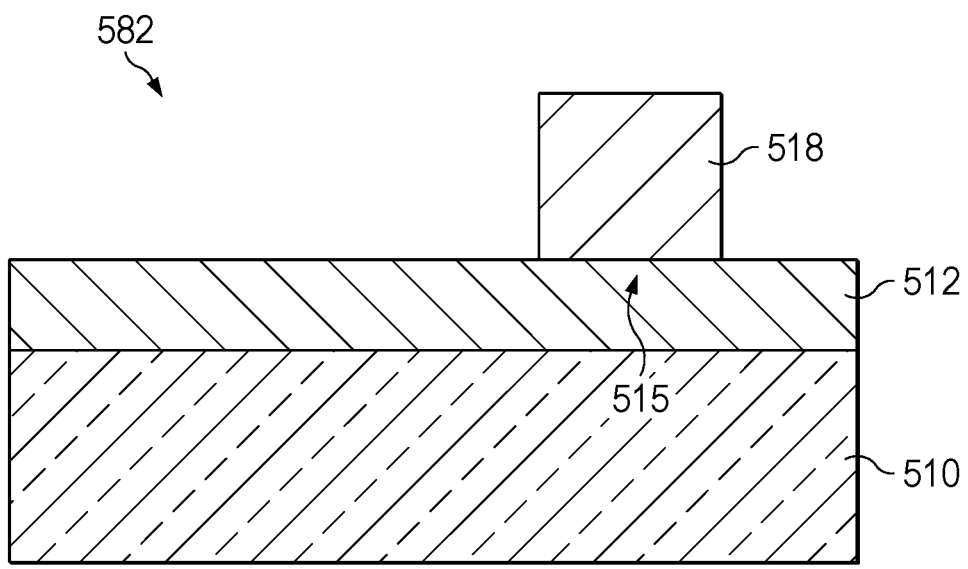
Figures 5, 6, 7, 8, 9, 10:
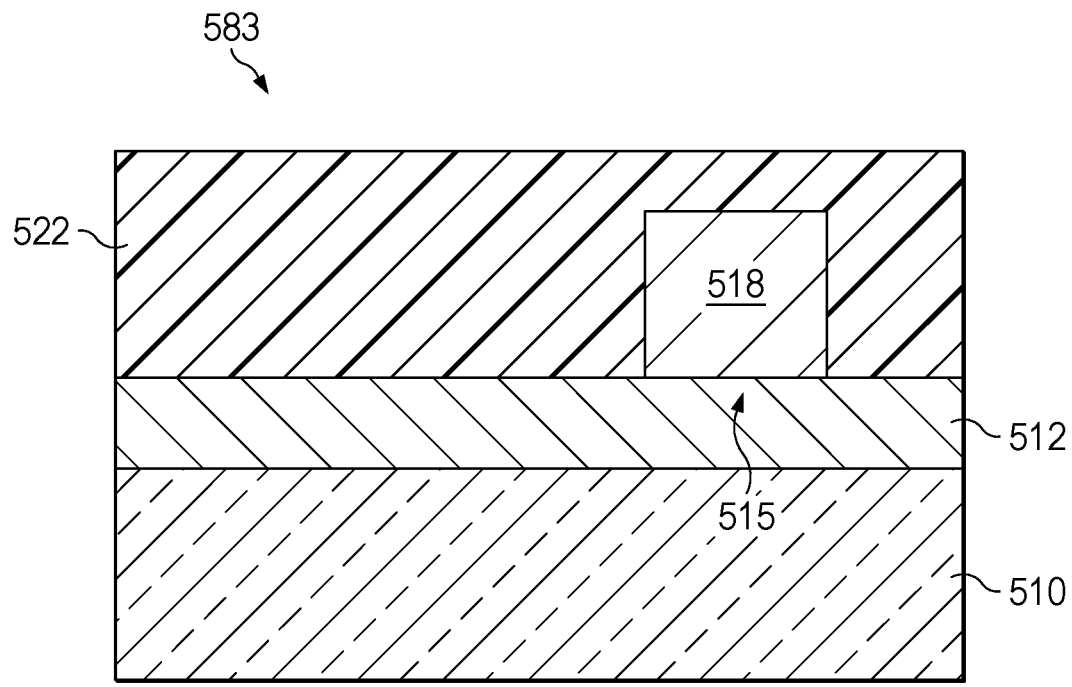
Figures 5, 6, 7, 8, 9, 10, 11:
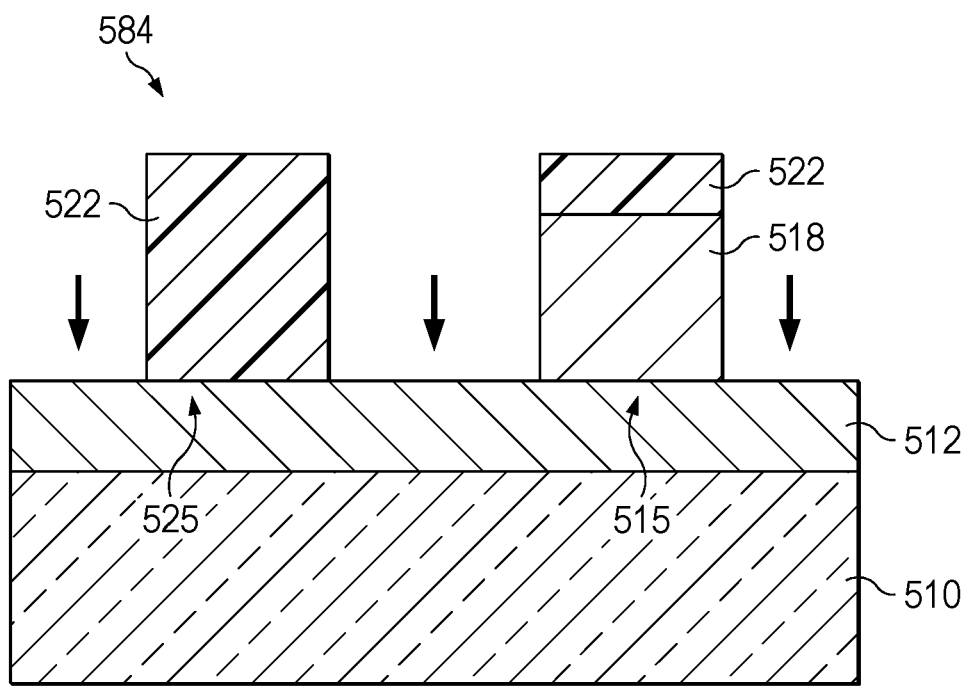
Figures 5, 6, 7, 8, 9, 10, 11, 12:
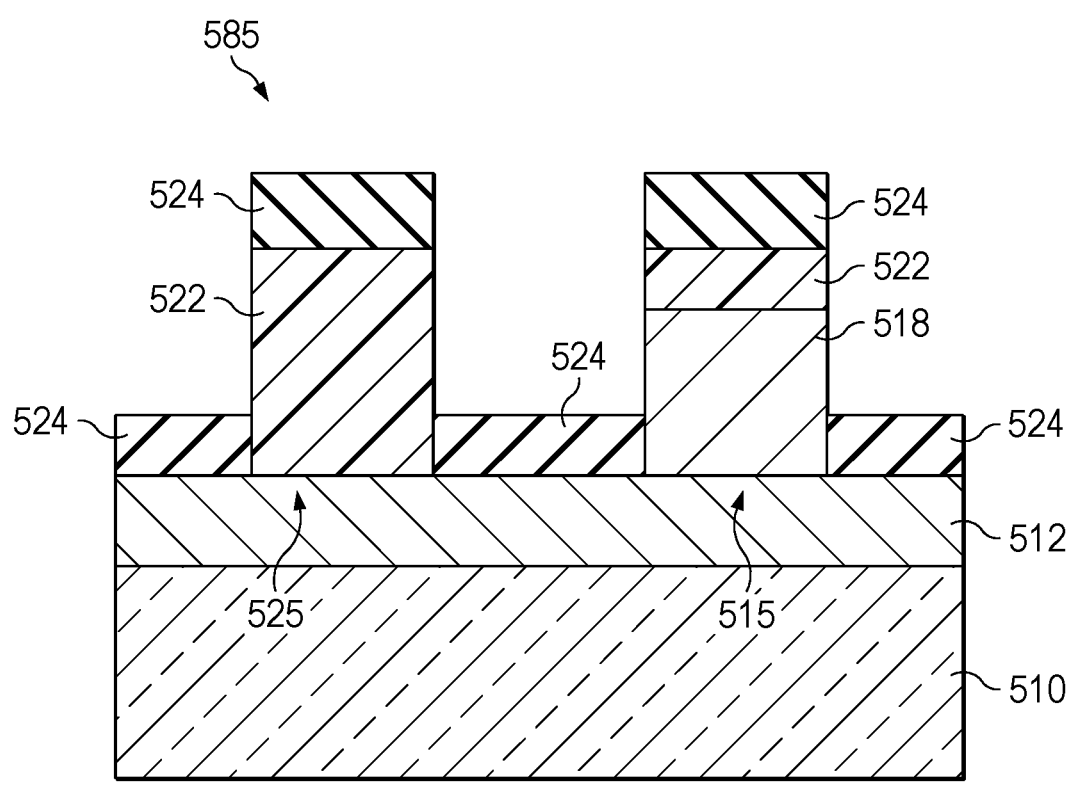
Figures 5, 6, 7, 8, 9, 10, 11, 12, 13:
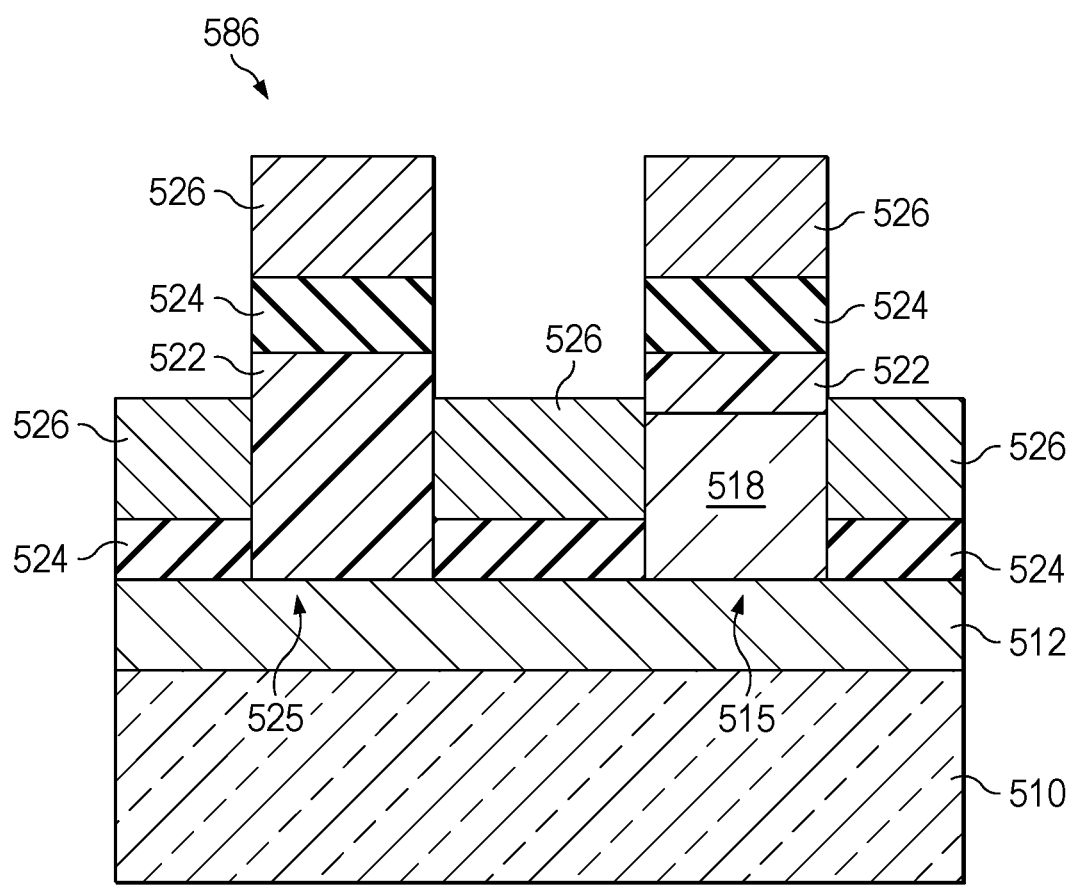
Figures 5, 6, 7, 8, 9, 10, 11, 12, 13, 14:
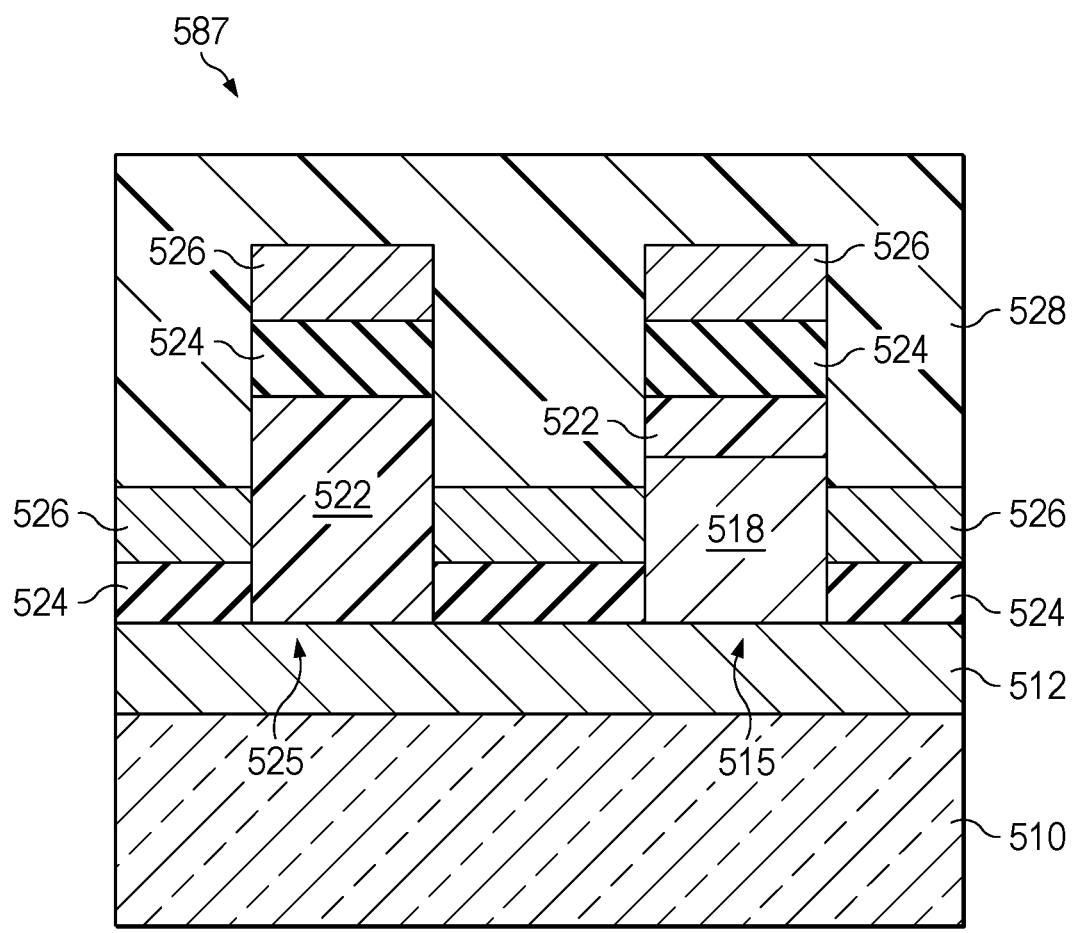
Figures 5, 6, 7, 8, 9, 10, 11, 12, 13, 14, 15:
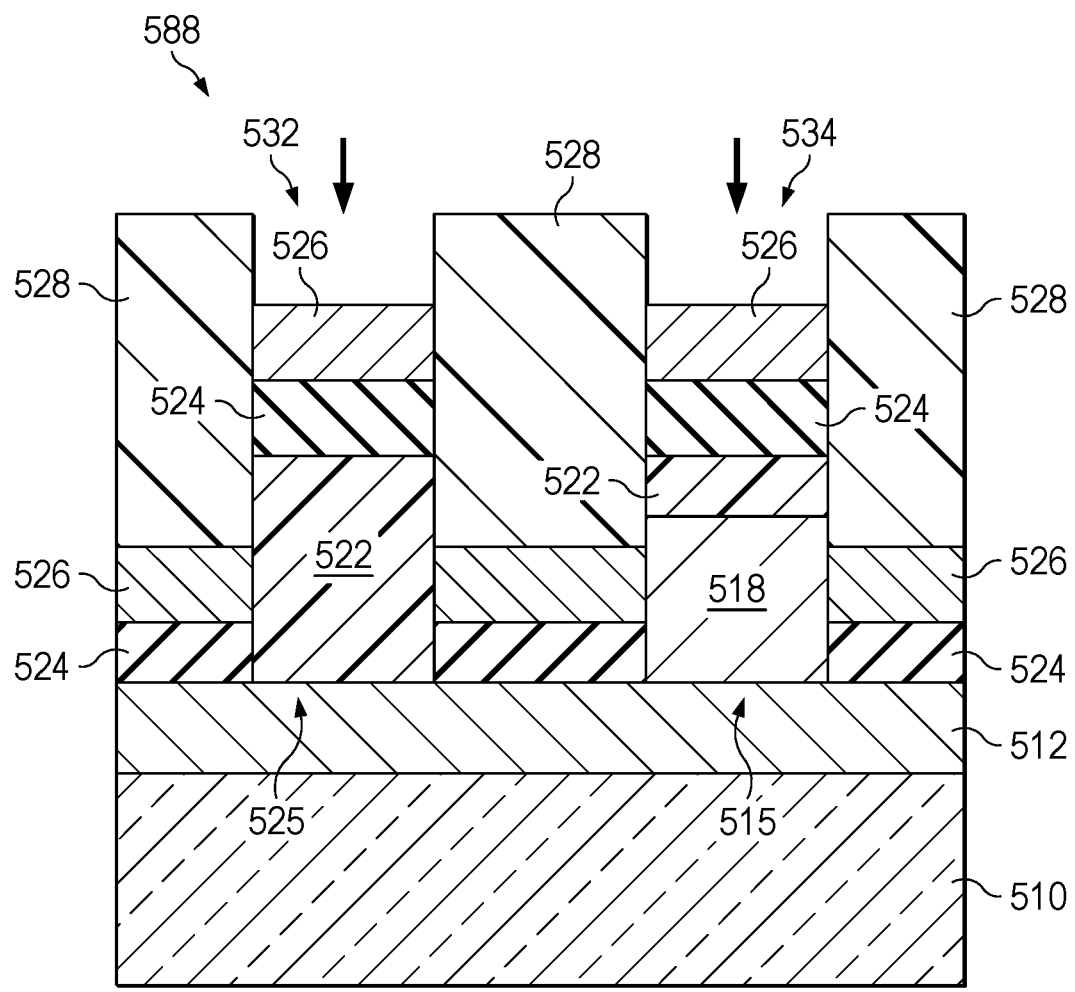
Figures 5, 6, 7, 8, 9, 10, 11, 12, 13, 14, 15, 16:
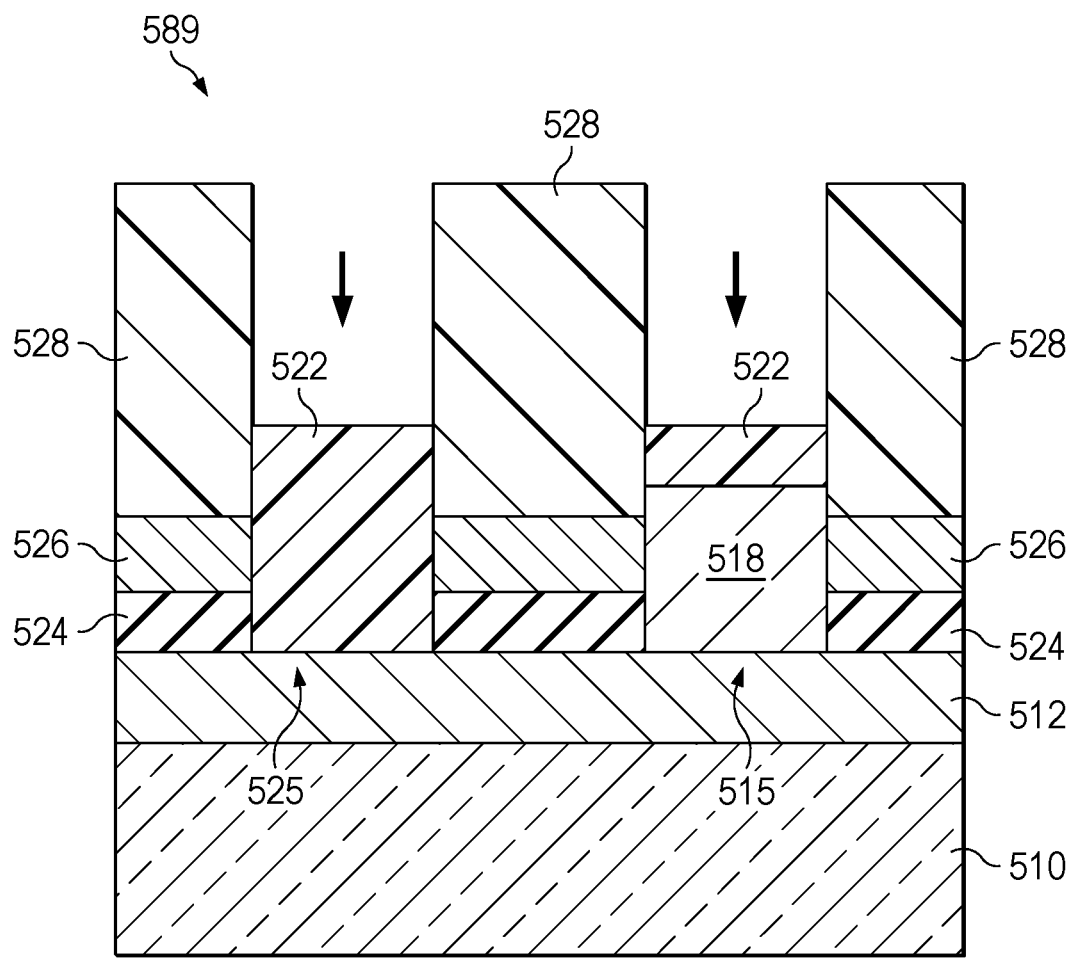
Figures 5, 6, 7, 8, 9, 10, 11, 12, 13, 14, 15, 16, 17:
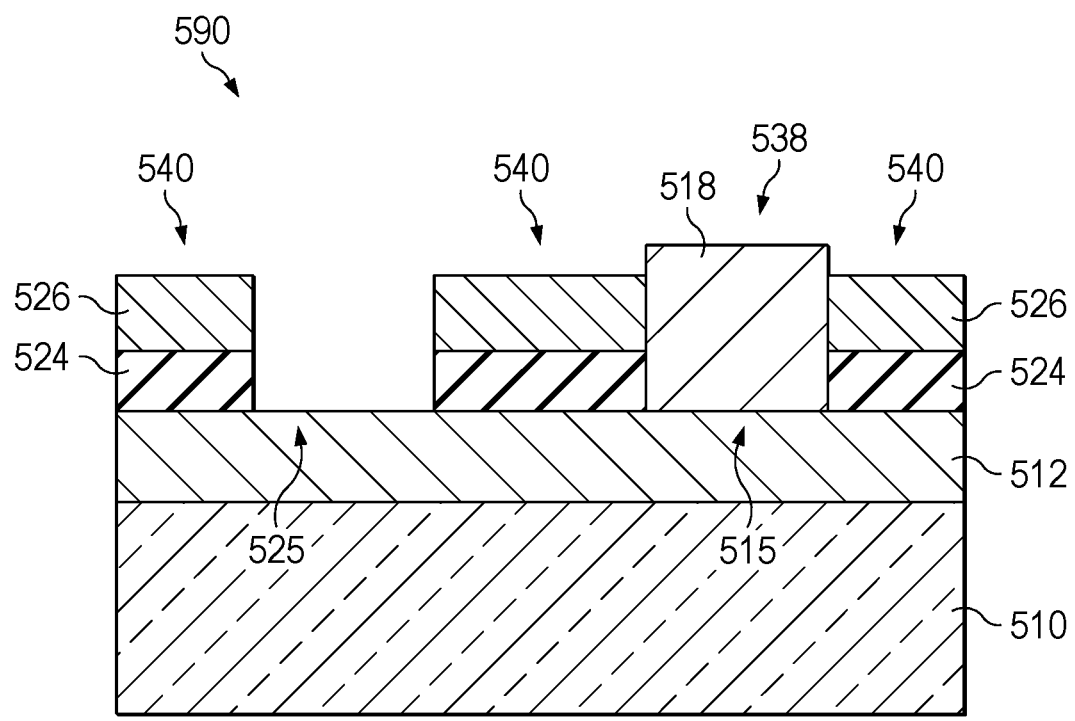
Figures 5, 6, 7, 8, 9, 10, 11, 12, 13, 14, 15, 16, 17, 18:
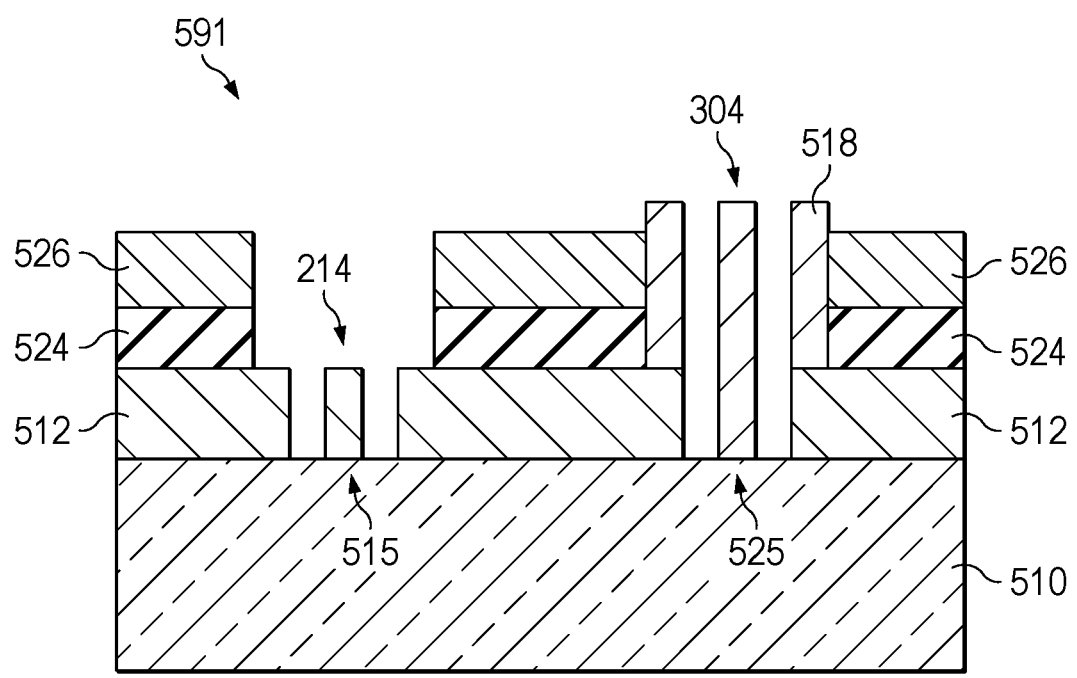
Figures 5, 6, 7, 8, 9, 10, 11, 12, 13, 14, 15, 16, 17, 18, 19:
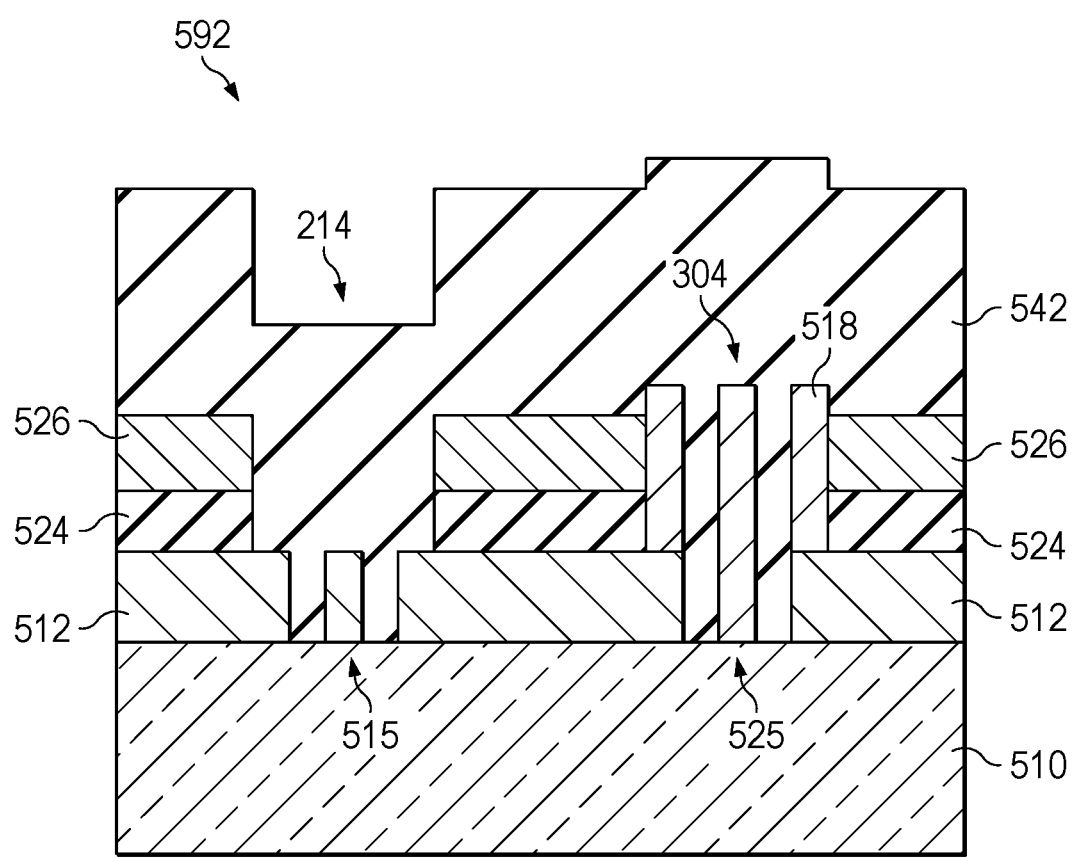
Figure 6:
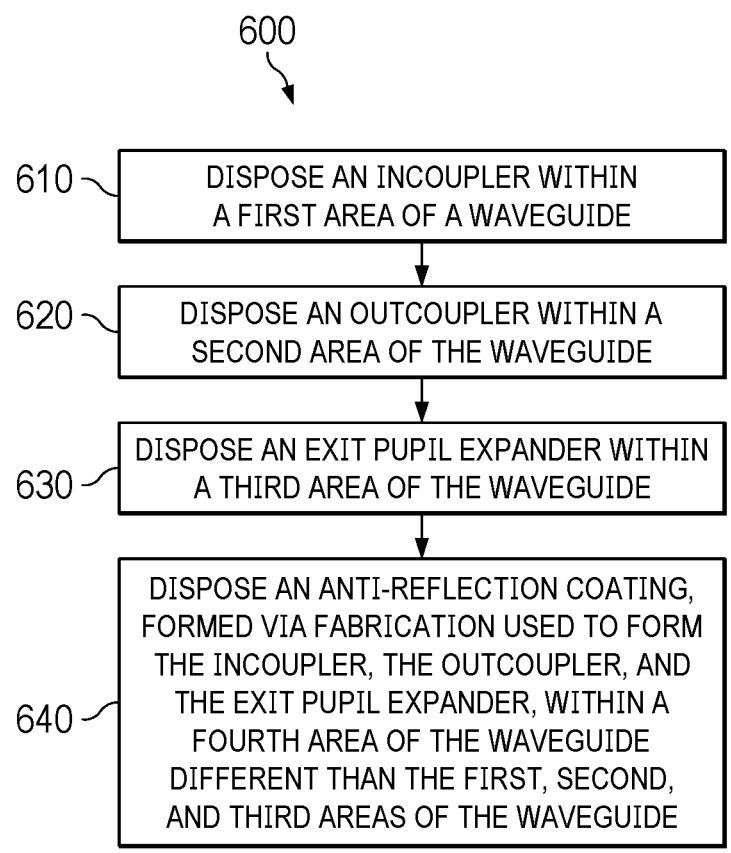

FIG. 5-8 shows another formation 581 of the integrated anti-reflection coating, incoupler, outcoupler device 400. For this formation 581, the formation 580 shown in FIG. 5-7 is subject to etching (wet or dry) that removes portions of the formation on both sides of the area 515. After etching, the area 515 includes a stack from top to bottom of the positive photoresist 520 and the TiOx layer 518 disposed atop the glass layer 510. On both sides of the area 515, a stack is formed from top to bottom of the negative photoresist 514 and the TiOx layer 512 disposed atop the glass layer 510. FIG. 5-9 shows the formation 581 from FIG. 5-8 after the negative photoresist 514 and the positive photoresist 520 are removed. As can be seen, a column of TiOx at area 515 remains after the negative photoresist 514 and the positive photoresist 520 are removed to form formation 582. Another positive photoresist layer 522 is deposited onto an entirety the formation 582 shown in FIG. 5-9, this formation 583 is illustrated in FIG. 5-10.

The formation 583 from FIG. 5-10 is subject to an IC/Exposed Pad (EP)/Open Cassette (OC) mask, UV, and etching (wet or dry) to remove the positive photoresist 522 in areas to the left and right of area 515, while the positive photoresist 522 remains atop the TiOx layer 518. Another area 525 left of the center of the formation 583 shown in FIG. 5-10 is formed with the positive photoresist 522 remaining atop this area 525, illustrated in FIG. 5-11, to form formation 584. A low index material, such as a SiOx layer 524, is deposited atop an entirety of the formation 584 illustrated in FIG. 5-11, to form formation 585 shown in FIG. 5-12. In some embodiments, the SiOx layer 524 is deposited via PVD. In some embodiments, the SiOx layer 524 is approximately 20 nm thick, with variations in thickness possible due to manufacturing inconsistency. A high index material, such as TiOx layer 526, is deposited atop an entirety of the formation shown in FIG. 5-12, producing formation 586 illustrated in FIG. 5-13.

A negative photoresist layer 528 is deposited atop an entirety of the formation 586 shown in FIG. 5-13, to form formation 587 illustrated in FIG. 5-14. Another IC/EC/OC mask, UV, and etching (wet or dry) is performed on the negative photoresist 528 to form formation 588 shown in FIG. 5-15. Two openings are formed in the negative photoresist 528 on either side of center of the formation 587, with a first opening 532 formed within area 525 and a second opening formed within area 515. Further etching on the formation 588 removes the TiOx layer 526 and the SiOx layer 524 within areas 525, 515, respectively, to form formation 589. Thereafter, resist removal is performed on formation 589 to remove the positive photoresist 522 and the negative photoresist 528 which forms formation 590 illustrated in FIG. 5-17. An outcoupler base 536 is shown as being formed in area 525 and an incoupler base 538 is shown as being formed in area 515, with an anti-reflection base 540 being formed on both sides of each of the outcoupler base 536 and the incoupler base 538, that is in areas outside of the outcoupler base 536 and the incoupler base 538.

FIG. 5-18 shows a formation 591 in which openings are formed within the outcoupler base 536 and the incoupler base 538. In some embodiments, this is performed via nanoimprint lithography. Two openings are shown as extending from a top of each of the outcoupler base 536 and the incoupler base 538 to a bottom of each of the outcoupler base 536 and the incoupler base 538. To protect the formation 591 from damage, a low index material, such as SiOx layer 542, is disposed atop an entirety of the formation 591, illustrated in FIG. 5-19. In some embodiments, the SiOx layer 542 is disposed atop the formation 591 via PVD encapsulation. In some embodiments, the SiOx layer 542 is 100 nm thick. Thus, the outcoupler 214 is formed in area 515 and the incoupler 304 is formed in area 515

FIG. 6 illustrates a block diagram of an example method 600 to dispose the anti-reflection coating 250 shown in FIGS. 2-5 on an area of the waveguide 212, in accordance with some embodiments. Method 600 begins at block 610. At block 610, the incoupler 210 is disposed within a first area of the waveguide 212. As discussed above, this first area of the waveguide 212 is shown in FIG. 4 as Zone 0 450 on the wafer top 410 of the waveguide 212.

At block 620 the outcoupler 214 is disposed within a second area of the waveguide 212. As discussed above, this second area of the waveguide 212 is shown in FIG. 4 as Zone 3 453 on the wafer top 410 of the waveguide 212.

At block 630 the exit pupil expander 304 is disposed within a third area of the waveguide 212. As discussed above, this third area of the waveguide 212 is shown in FIG. 4 as Zone 2 452 on the wafer top 410 of the waveguide 212.

At block 640 the anti-reflection coating 250 is disposed within a fourth area of the waveguide different than the first, second, and third areas of the waveguide. As discussed above, this fourth area of the waveguide 212 is shown in FIG. 4 as Zone 0 450 on the wafer top 410 of the waveguide 212. The anti-reflection coating 250 is formed via fabrication that is used to form the incoupler 210, the outcoupler 214, and the exit pupil expander 304, as discussed in detail above with respect to FIG. 5.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a waveguide to couple light from an image source, the waveguide comprising:
an incoupler disposed within a first area of the waveguide;
an outcoupler disposed within a second area of the waveguide;
an exit pupil expander disposed within a third area of the waveguide; and
an anti-reflection coating disposed within a fourth area of the waveguide different than the first, second, and third areas of the waveguide,
wherein the incoupler, the outcoupler, the exit pupil expander, and the anti-reflection coating are located on a first side of the waveguide and the first area, the second area, and the third area are substantially free of the anti-reflection coating.

2. The system of claim 1, wherein the anti-reflection coating is selectively disposed in an area between the exit pupil expander and the outcoupler.

3. The system of claim 1, wherein the anti-reflection coating coats areas of the first side of the waveguide outside of the first area, the second area, and the third area.

4. The system of claim 1, wherein the first area, the second area, and the third area are substantially surrounded by the fourth area.

5. The system of claim 1, wherein the incoupler, the outcoupler, and the exit pupil expander include gratings that act as a quarterwave stack.

6. The system of claim 1, wherein the anti-reflection coating is a first anti-reflection coating, the system further comprising a substrate and a second anti-reflection coating disposed on an opposite side of the substrate from the first anti-reflection coating.

7. A head-mounted display (HMD) system comprising:
a lens element supported by a support structure, the lens element including a waveguide, the waveguide comprising:
an incoupler;
an outcoupler;
an exit pupil expander; and
an anti-reflection coating selectively disposed in an area between the exit pupil expander and the outcoupler, wherein the exit pupil expander and the outcoupler are substantially free from the anti-reflection coating.

8. The HMD of claim 7, wherein the anti-reflection coating, the exit pupil expander, and the outcoupler are located on a first side of the waveguide.

9. The HMD of claim 8, wherein the anti-reflection coating coats areas of the first side of the waveguide outside of any areas where the incoupler, the outcoupler, and the exit pupil expander are deposited.

10. The HMD of claim 8, wherein the incoupler, the outcoupler, and the exit pupil expander are substantially surrounded by the anti-reflection coating on the first side of the waveguide.

11. The HMD of claim 7, wherein the incoupler, the outcoupler, and the exit pupil expander include gratings that act as a quarterwave stack.

12. The HMD of claim 7, wherein the anti-reflection coating is a first anti-reflection coating, the system further comprising a substrate and a second anti-reflection coating disposed on an opposite side of the substrate from the first anti-reflection coating.

13. A method comprising:
disposing an incoupler within a first area of a waveguide;
disposing an outcoupler within a second area of the waveguide;
disposing an exit pupil expander within a third area of the waveguide; and
disposing an anti-reflection coating within a fourth area of the waveguide different than the first, second, and third areas of the waveguide, wherein the first area, the second area, and the third area are substantially free of the anti-reflection coating.

14. The method of claim 13, wherein the anti-reflection coating comprises a four-layer stack.

15. The method of claim 14, wherein the four-layer stack comprises a low index material layer disposed between first and second high index material layers, the first high index material layer formed onto a substrate layer.

16. The method of claim 15, wherein the first high index material layer is thicker than the low index material layer, and the second high index material layer is thicker than the first high index material layer.

17. The method of claim 15, wherein the low index material layer is a first low index material layer, and a second low index material layer is disposed onto the second high index material.

18. The method of claim 13, wherein the incoupler, the outcoupler, and the exit pupil expander include gratings that act as a quarterwave stack.

* * * * *